Feb. 22, 1927.
R. J. MEYERS ET AL
1,618,602
INTERNAL COMBUSTION ENGINE
Filed Aug. 20, 1925  2 Sheets-Sheet 2
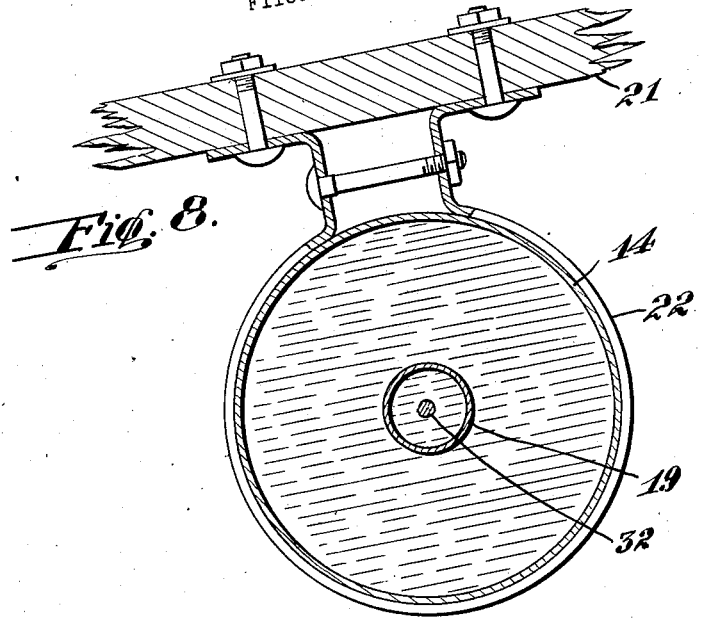
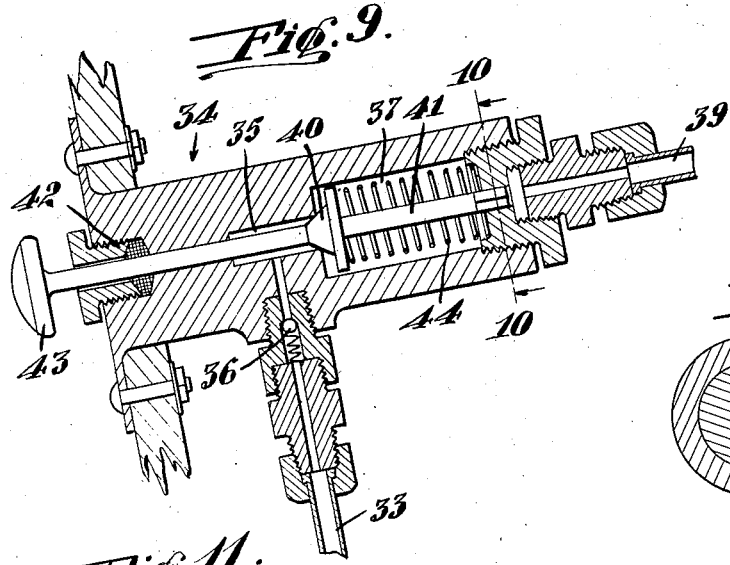
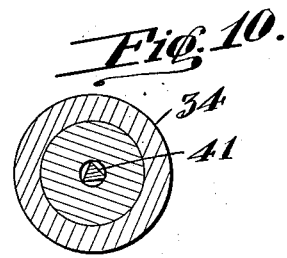
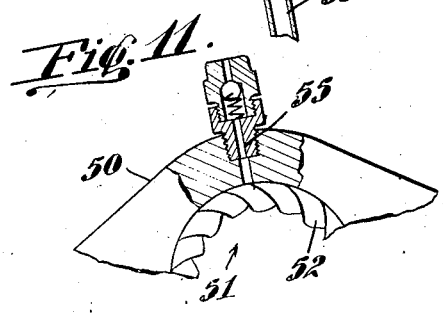
Inventors:
Roy Jerome Meyers
and Morris Schlosberg
By R. S. Berry
Attorney.

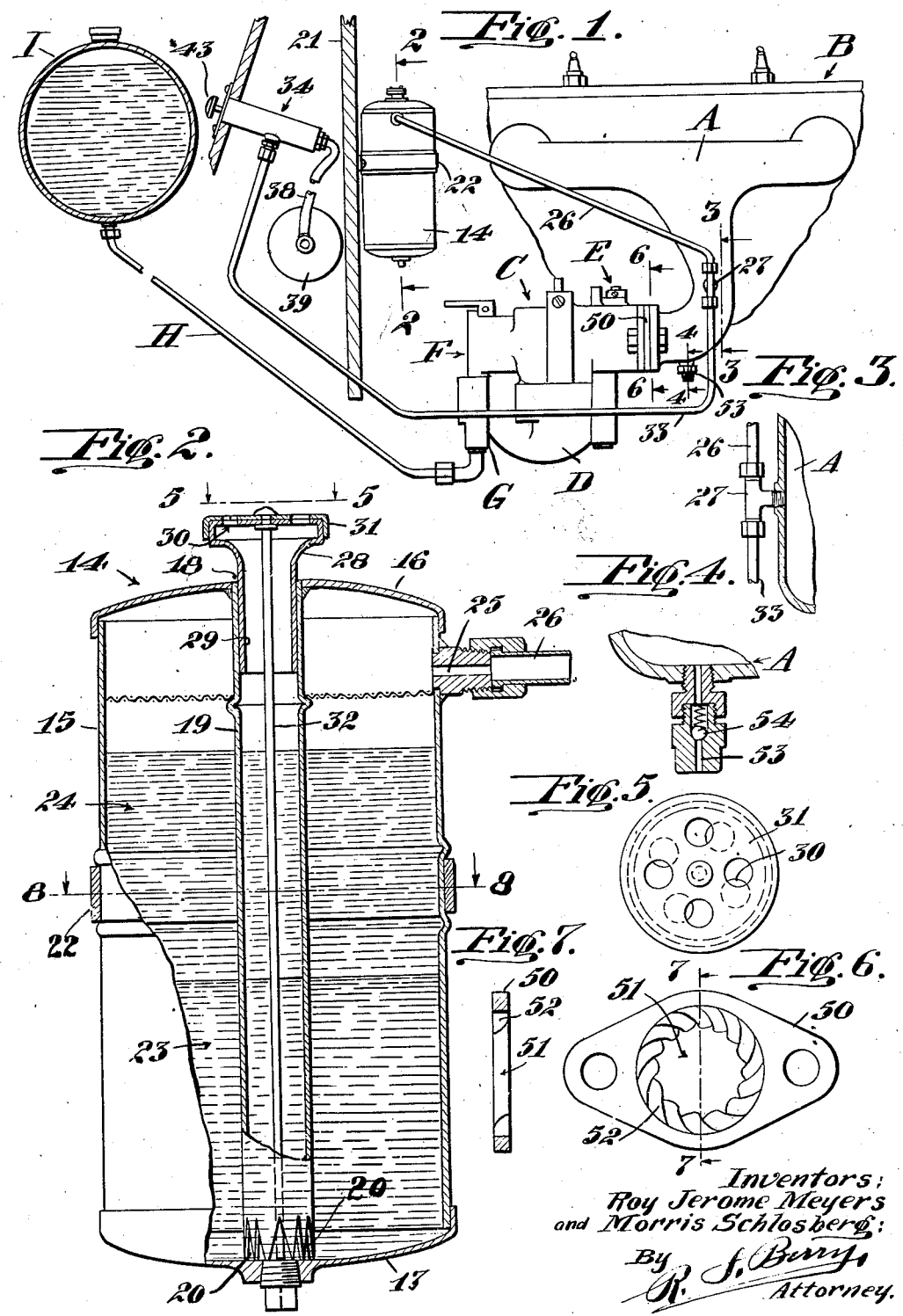

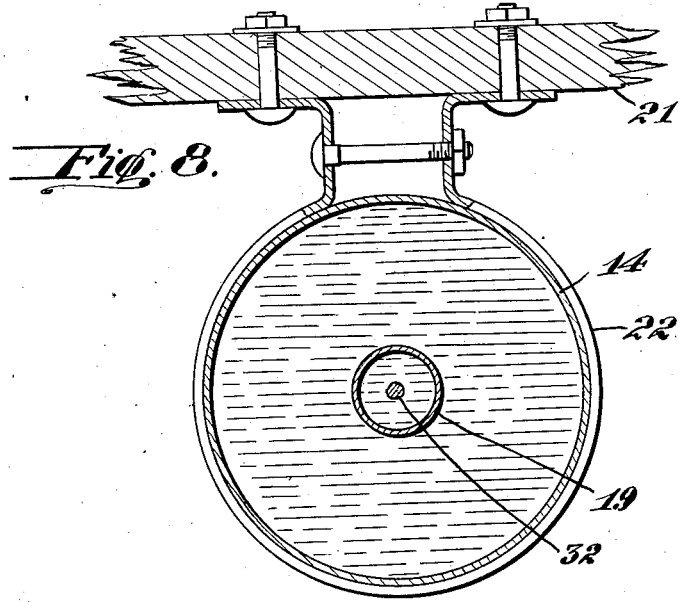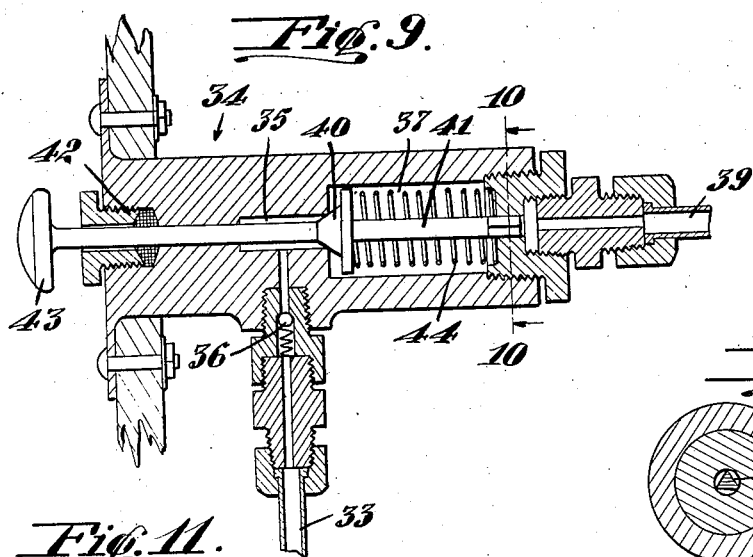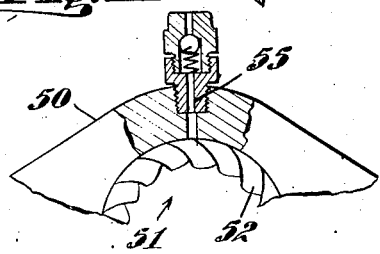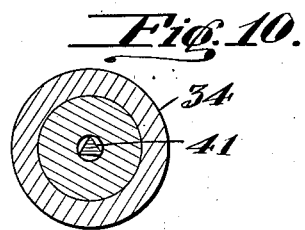

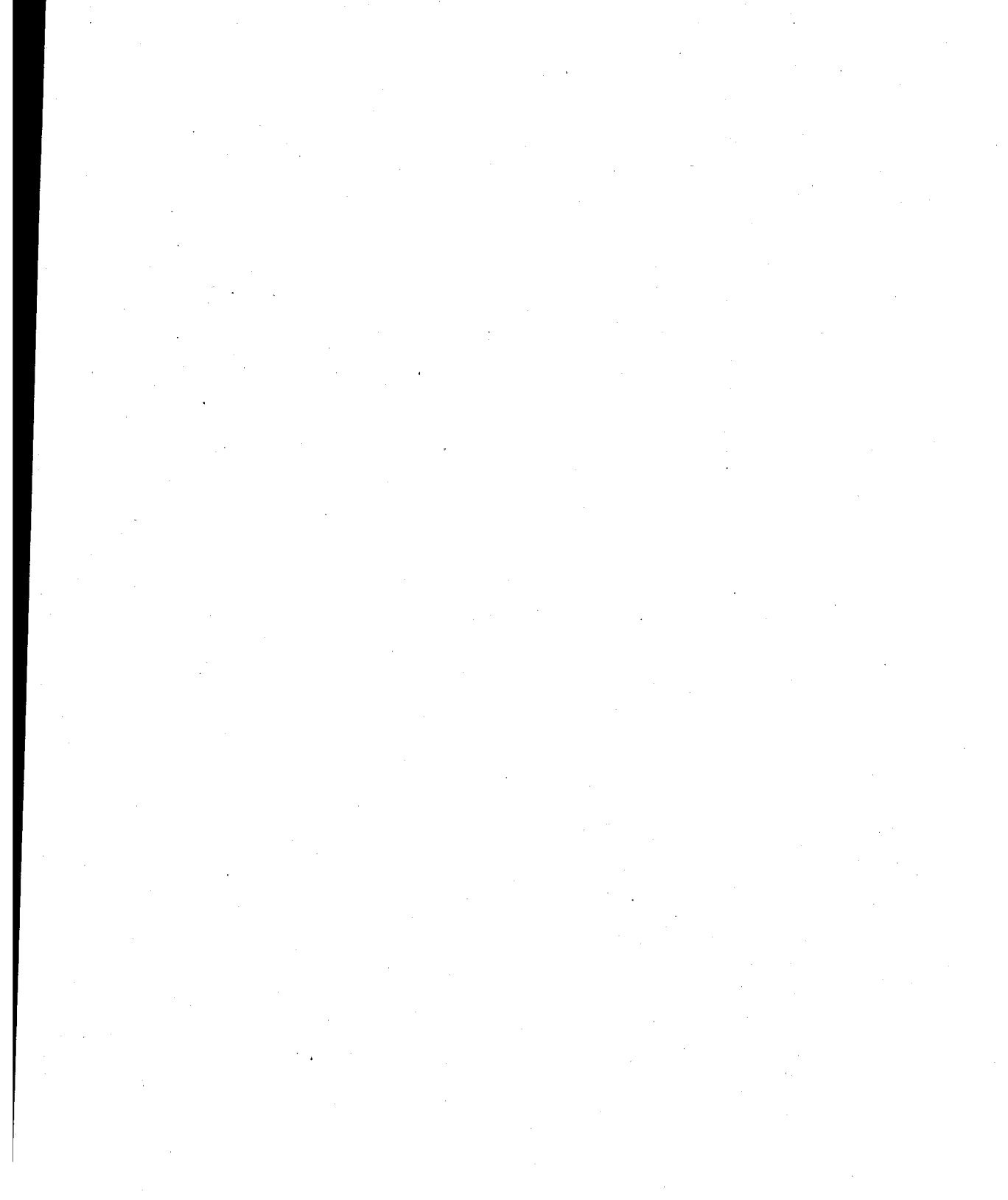

Patented Feb. 22, 1927.

1,618,602

UNITED STATES PATENT OFFICE.

ROY JEROME MEYERS, OF HOLLYWOOD, AND MORRIS SCHLOSBERG, OF LOS ANGELES, CALIFORNIA.

INTERNAL-COMBUSTION ENGINE.

Application filed August 20, 1925. Serial No. 51,328.

This invention particularly pertains to means and method of operating internal combustion engines with hydrocarbon fuels of heavy gravity and has as its primary object the provision of an appliance which is adapted to be fitted to ordinary internal combustion engines, such as are employed in the operation of motor vehicles, whereby tops or residuum oil may be substituted for gasoline and used as fuel with great efficiency and economy.

Another object is to provide an appliance of the above character which is simple in construction and which is reliable in operation.

A further object is to provide a method whereby the engine cylinders may be charged with a highly combustible mixture composed of a heavy hydrocarbon, water and air in such manner as to insure ready ignition and thorough combustion of the charge in the engine.

Another object is to provide an effective means for facilitating intial ignition of a charge in the engine cylinders so as to insure prompt starting of the engine in effecting preliminary heating thereof.

The invention resides generally in forming one mixture of hydrocarbon vapors and air, then forming another mixture of hydrocarbon vapors, water and air and combining these mixtures as they enter the engine cylinders and further resides in the provision of a means whereby a volume of acetylene gas may be fed to the engine cylinder, together with such mixtures, in effecting initial starting of the engine.

The invention also resides in forming an intimate mixture of the hydrocarbon, water and air in substantially definite proportions by passing air first through a volume of water to effect humidification thereof then passing the water-laden air through a volume of hydrocarbon whereby oil is picked up and intermingled with the air and water, and then intermixing this mixture with a primary mixture of heavy hydrocarbon vapors and air in the engine intake manifold.

The invention is illustrated by way of example in the accompanying drawings, in which:—

Fig. 1 is a diagrammatic view depicting the application of the invention;

Fig. 2 is an enlarged detail in section and elevation as seen on the line 2—2 of Fig. 1;

Fig. 3 is a detail in elevation as seen on the line 3—3 of Fig. 1.

Fig. 4 is a detail in section as seen on the line 4—4 of Fig. 1;

Fig. 5 is a detail in plan as seen on the line 5—5 of Fig. 2;

Fig. 6 is a detail in section and elevation as seen on the line 6—6 of Fig. 1;

Fig. 7 is a detail in vertical section as seen on the line 7—7 of Fig. 6;

Fig. 8 is a detail in horizontal section as seen on the line 8—8 of Fig. 2;

Fig. 9 is a detail in vertical section of a starting valve employed in effecting initial starting of the engine;

Fig. 10 is a view in cross section as seen on the line 10—10 of Fig. 9;

Fig. 11 is a view of a modified form of arrangement of the air intake shown in Fig. 4.

Referring to the drawings more specifically, A indicates the intake manifold of an internal combustion engine, designated in part at B and embodying the usual engine cylinders, piston and spark plug not necessary to be here shown. The intake manifold is connected to the outlet of a carburetor C of ordinary construction, fitted with a float chamber D, a throttle E, air intake F, and fuel feed intake G from which latter leads a conduit H connecting with a reservoir I containing a hydrocarbon fuel, which fuel by virtue of the present invention may consist of what is known as tops oil which is a residuum oil remaining after processing petroleum in the recovery of gasoline, kerosene and similar distillates, and which oil may now be obtained at very low cost in comparison to the cost of gasoline and similar light gravity hydrocarbons.

In carrying out our invention we provide a supplemental reservoir indicated generally at 14 which includes a cylindrical side wall 15 and top and bottom walls 16 and 17; the top wall 16 being formed with a central aperture 18 from which leads a downwardly extending tube 19 terminating adjacent the bottom wall 17 and formed with serrations 20 at its lower end. The supplemental reservoir is mounted at any convenient point adjacent the engine B, it being here shown as supported on a panel 21 by means of a clamp 22. The reservoir 14 is designed to receive a quantity of water indicated at 23 and also a quantity of hydrocarbon 24 which may consist of a heavy hydrocarbon corre-